United States Patent [19]

Brickell et al.

[11] Patent Number: 5,035,357
[45] Date of Patent: Jul. 30, 1991

[54] PRESSURE CONTROL VALVE AND SYSTEM

[75] Inventors: Joseph W. Brickell; Steven W. Post, both of Jonesboro, Ark.

[73] Assignee: FMC Corporation, Chicago, Ill.

[21] Appl. No.: 479,809

[22] Filed: Feb. 14, 1990

[51] Int. Cl.⁵ .............................................. A01C 23/00
[52] U.S. Cl. .................................... 239/156; 239/63; 137/489.5
[58] Field of Search ...................... 239/63, 67, 68, 127, 239/156, 551; 137/489.5; 251/129.11

[56] References Cited
U.S. PATENT DOCUMENTS
3,020,925  2/1962  Randell et al. ................... 137/489.5

FOREIGN PATENT DOCUMENTS
470332  10/1974  Australia .............................. 239/67
2063517  6/1981  United Kingdom ................ 239/156
2064826  6/1981  United Kingdom .................. 239/63

Primary Examiner—Andres Kashnikow
Assistant Examiner—Lesley D. Morris
Attorney, Agent, or Firm—Ronald C. Kamp; R. B. Megley

[57] ABSTRACT

A pressure control system, including a pilot valve suitable for use therein, for providing a constant pressure from a non-compensated pump to a plurality of nozzle valves controlling flow from a manifold to nozzles associated with the valves, including a pressure control valve interposed between the pump and the manifold which is response to a control pressure created by a pilot valve which reduces manifold pressure to the control pressure.

4 Claims, 3 Drawing Sheets

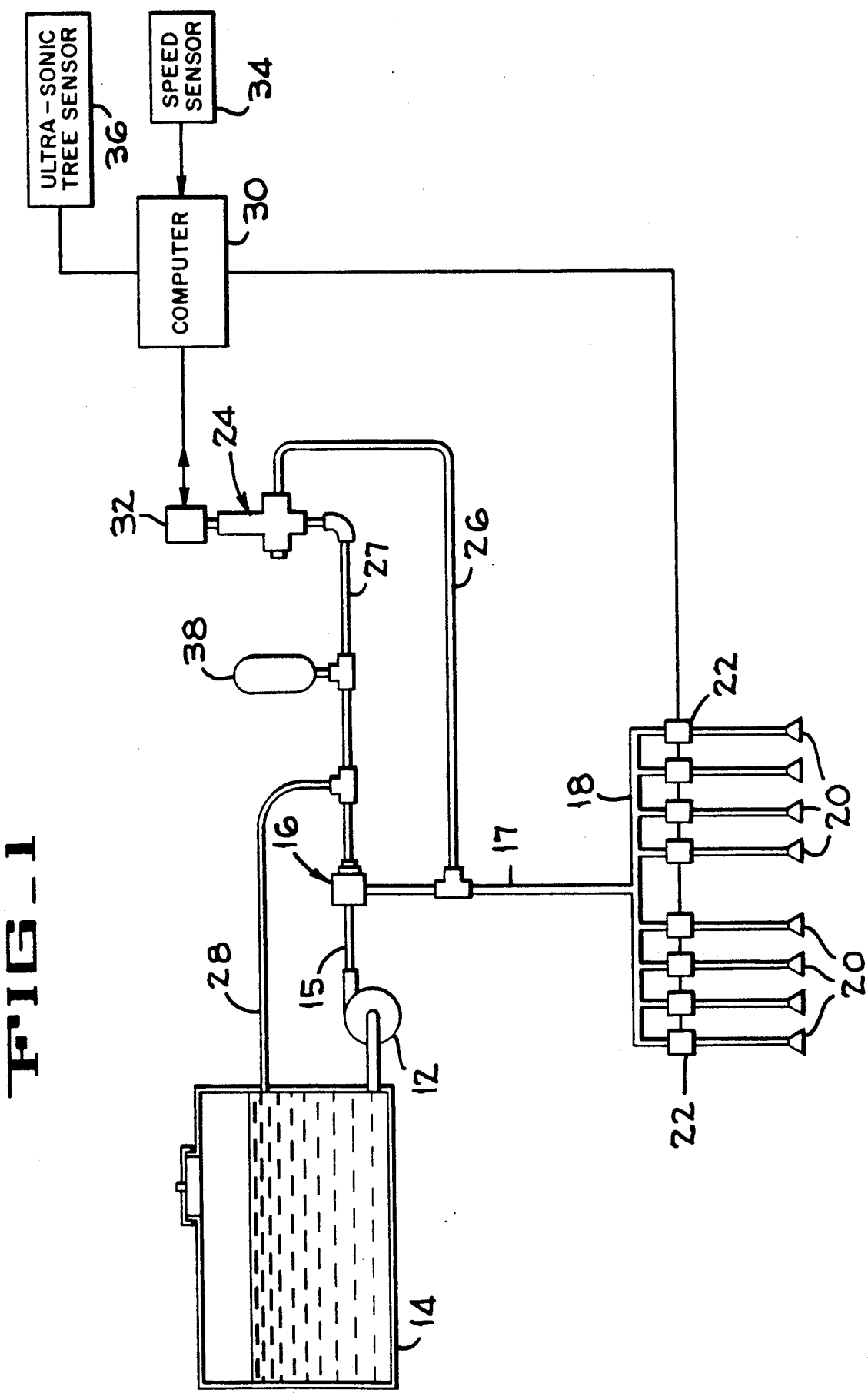
FIG_1

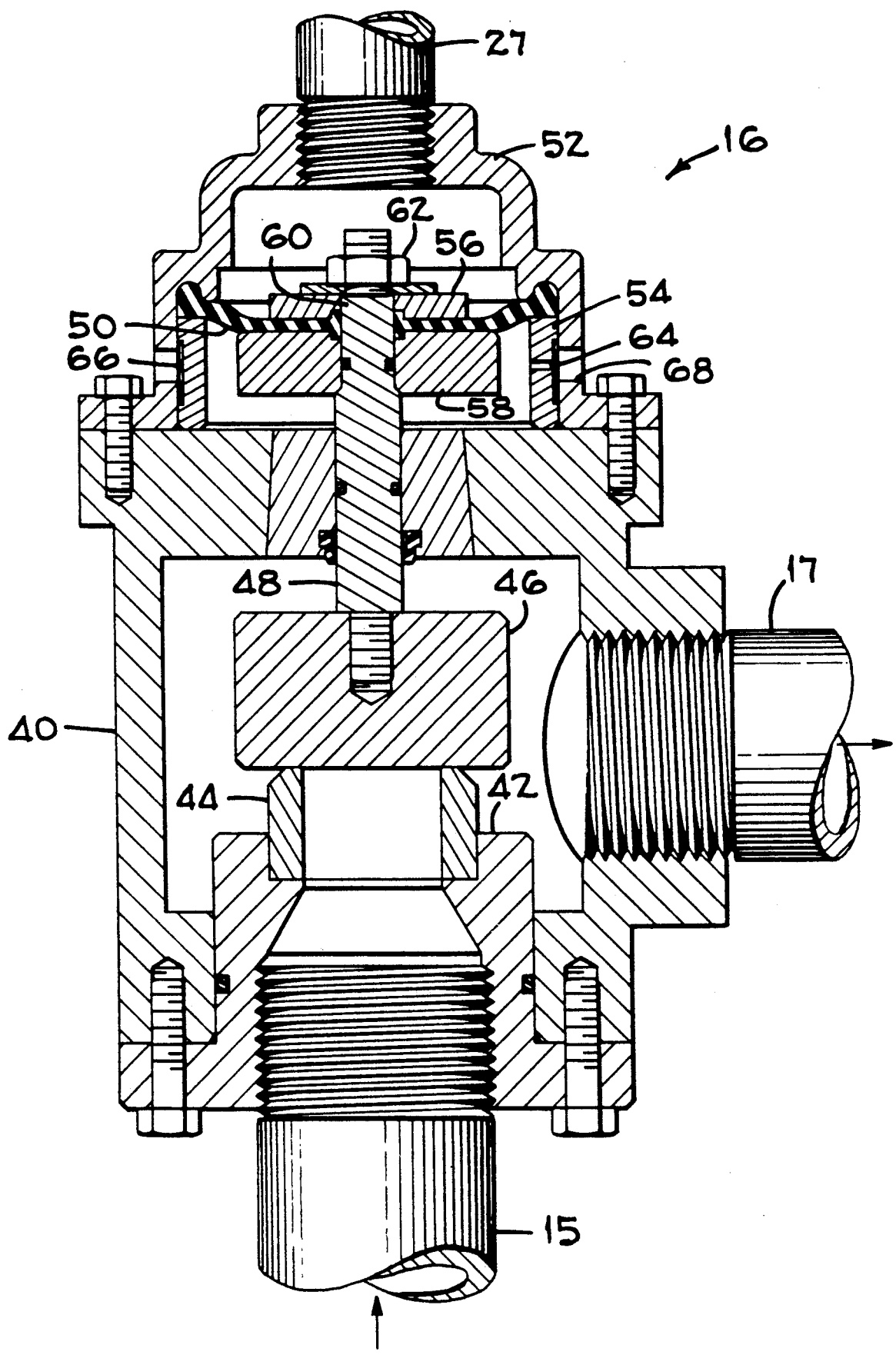
FIG_2

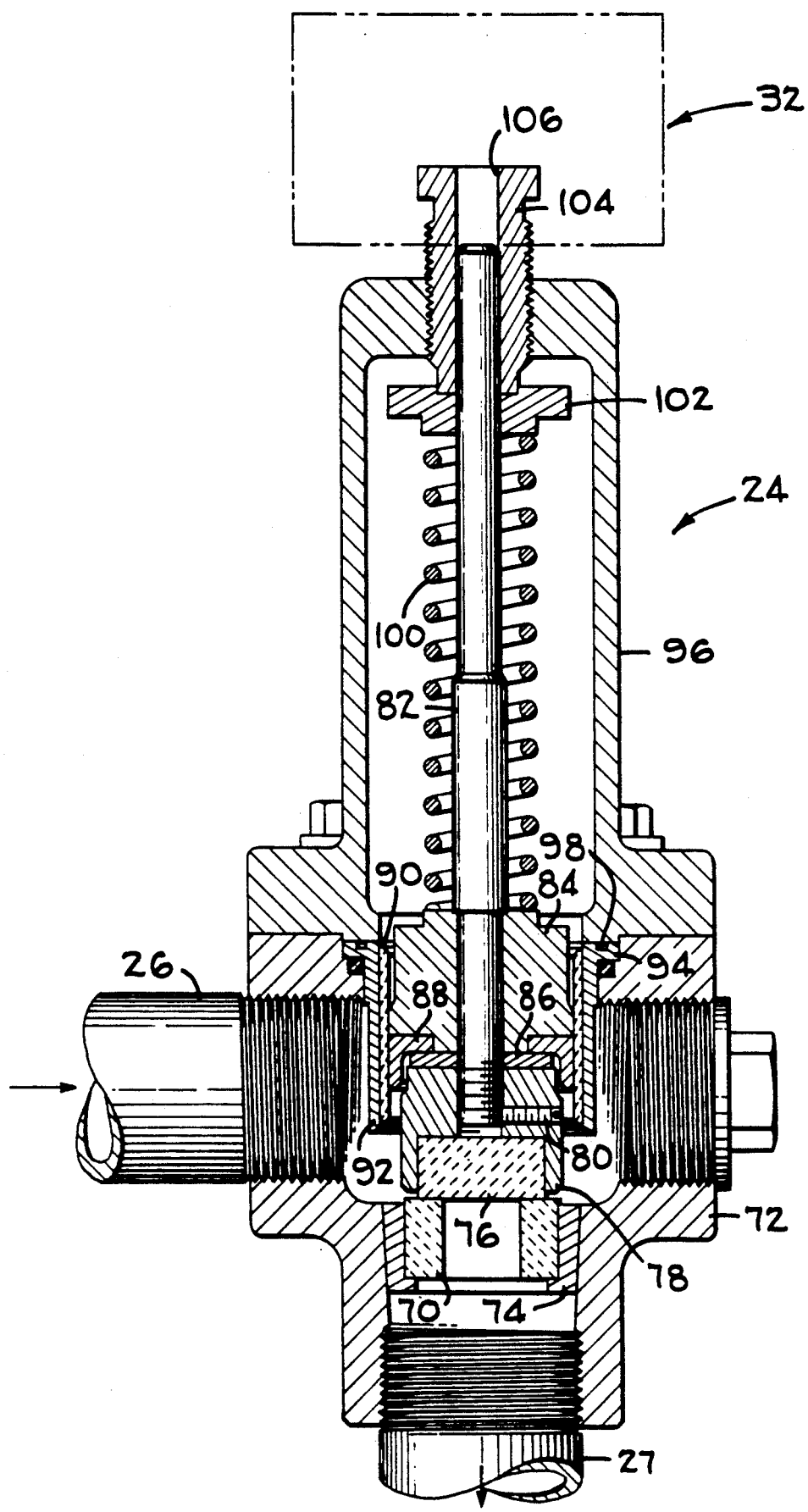
FIG_3

PRESSURE CONTROL VALVE AND SYSTEM

This invention relates to pressure control valves and systems for maintaining a constant pressure under conditions of varying flow.

Maintaining a relatively constant pressure for a liquid under varying conditions of flow has been a problem for some time, especially when a simple, inexpensive, non-compensating pump, such as a centrifugal pump, is utilized to provide liquid under pressure. An example of such an application is an air sprayer for use in groves and vineyards. Typically, an air sprayer provides treatment liquids, e.g., insecticides or fungicides dissolved in water, by entraining them in a constant stream of air from a blower. To reduce the possibility of environmental contamination and cost of application, some air sprayers, such as disclosed in U.S. Pat. application Ser. No. 07/414,622, filed Sep. 29, 1989, sense the presence of trees to be sprayed and turn on sprayer valves to disperse the treatment liquid only in response to such presence. This rapid opening and closing of the sprayer valves results in rapid and large variations in flow requirements. Maintaining a constant pressure, in order to provide a uniform application rate of the treatment liquid, under such conditions is difficult, but necessary.

Another necessary attribute of a sprayer is the ability to operate effectively at numerous set pressures while maintaining constant output pressure attributes during flow variation, and to change the flow rate as a function of the ground speed of the sprayer in order to provide a uniform application rate for the treatment liquid regardless of such ground speed variations.

The present invention provides a pressure control valve and system which exhibits the attributes mentioned above, which can be readily incorporated into existing sprayers, and which is reliable and relatively inexpensive.

These and other attributes of the present invention will become more readily apparent from a perusal of the following description and the accompanying drawings, wherein:

FIG. 1 is a schematic diagram of a system according to the present invention as applied to an air sprayer;

FIG. 2 is a cross-sectional view of a pressure control valve, utilized in the system shown in FIG. 1, and;

FIG. 3 is a cross-sectional view of a pilot valve utilized in the system of FIG. 1.

Referring now to FIG. 1, there is shown a pressure control system indicated generally at 10, as applied to an air sprayer. A centrifugal pump 12 draws treatment liquid from a tank 14 and supplies the liquid under pressure through an inlet conduit 15 to a pressure control valve 16. The valve 16 throttles flow into the supply conduit 17 and to a manifold 18. The manifold 18 supplies liquid under pressure to a plurality of spray nozzles 20. The flow of liquid from the manifold to each nozzle 20 is controlled by a spray nozzle valve 22, each of which is preferably an electro-pneumatically actuated on-off valve. The throttling action of the pressure control valve 16 is controlled by an internal diaphragm, with the force exerted by the diaphragm being determined by the pressure exerted on one side thereof. This pressure is determined by a pilot valve 24 which controls the flow from a pilot line 26, which is teed into the supply conduit 17, through a regulating conduit 27 and a bleeder line 28 teed into the conduit 27 back to the tank 14. The pressure setting of the pilot valve 24 is determined by a microprocessor or computer 30 which controls the position of a stepper motor 32 in response to the input from a speed sensor 34, which determines the ground speed of the sprayer, and an ultra-sonic tree sensor 36, which determines when a tree, or portion thereof, is present to be sprayed with the liquid. The computer 30 also uses this input data to determine which ones of the valves 22 should be opened and when those valves should be opened. An accumulator 38 is also teed into the regulating conduit 27 connecting the pilot valve 24 to the pressure control valve 16. The accumulator 38 accommodates the square wave flow requirements of the individual spray nozzle valves 22 and to dampen any resonance occurring as a consequence of multiple ones of these valves being rapidly cycled on and off.

The pressure control valve 16, as shown in FIG. 2, has a valve housing 40 to which a valve seat holder 42 is secured. A valve seat 44 is secured, such as by adhesive, to the holder 42. The inlet conduit 15 is secured to the holder 42 and directs the output from the pump 12 to the opening defined by the valve seat 44. A valve disk 46 which, like the seat 44, is preferably formed of a hardened stainless steel or ceramic material, is positioned to engage the seat 44, as shown, and seal the interior of the housing 40 from the conduit 15, but may move away from the seat 44 to permit flow from the pump 12 to be directed to the supply conduit 17. A valve stem 48 is attached to the valve disk 46 and slidably extends through an opening in the housing 40. A diaphragm 50 is positioned in a diaphragm housing 52 secured to the valve housing 40. An annular diaphragm support 54 is positioned between the diaphragm 50 and the valve housing 40 and retains the diaphragm by forcing a lip formed on the periphery of the diaphragm into a complementary groove formed in the housing 52. The diaphragm 50 is secured to the valve stem 48 by upper and lower diaphragm supports 56 and 58 respectively; the lower support 58 being held against a shoulder formed by a reduced diameter portion 60 on the outer end of the stem 48 by a nut 62 engaging the threaded end of the stem 48. The volume between the diaphragm 50 and the valve housing 40 is vented to atmosphere by a radial opening 64 in the diaphragm support 54 which communicates with an annular groove 66 formed in the outer surface thereof. The groove 66 communicates with openings 68 in the diaphragm housing eliminating the need for registry between openings 64 and 68. The stem 48 is provided with appropriate seals to preclude liquid entry to the space between the diaphragm 50 and the housing 40. The valve stem 48 will move the attached valve disk 46 toward and away from the seat 44 to respectively decrease and increase liquid flow into the conduit 17 as a function of pressure acting on the outer surface of the diaphragm 50.

The pilot valve 24 has a valve seat 70 secured in the valve housing 72 by a seat retainer 74 which is tapered and pressed into a complementary taper on the interior of the housing 72. A valve disk 76, which, like the seat 70, is preferably made of a ceramic material, is secured by adhesive to a valve disk holder 78. A set screw 80 secures the holder 78 to a valve rod 82. A piston 84 is trapped on the rod 82 between a shoulder formed thereon and the holder 78 with a washer 86 interposed to retain a packing holder 88. The packing holder 88 slidably, but sealingly, engages a cylinder 90, which preferably is made of a ceramic material with a steel sleeve 92 heat shrunk thereon. The sleeve 92 has a outerward projecting flange 94 trapped in an annular recess formed in the valve housing 72 by the spring housing 96, which is bolted to the housing 72. An annular groove 98 is formed in the outer surface of the flange 94 to relieve stresses induced in the sleeve 92 when shrunk onto the cylinder 90. A compression spring 100 is trapped on the rod 82 between the piston 84 and an upper spring holder 102. The spring holder 102 is slidable on the rod 82 and bears against the lower end of spring adjuster 104, which threadedly engages a threaded opening formed in the top of the spring housing 96. The rod 82 slidably extends through a longitudinal bore 106 formed in the adjuster 104. The force exerted by the spring 100 on the piston 84 can be varied by rotating the adjuster 104.

The pressure in the supply conduit 17 is transmitted through the pilot line 26 and acts on the annular area of the piston, i.e., the area of the piston minus the area of the valve disk 76, to move the valve disk 76 away from the seat 70. The fluid will flow through the valve 24 from the pilot line 26 to the regulating conduit 27 and will bleed off through the bleeder line 28. The diameter and length of the bleeder line 28 functions as an orifice to drop the pressure between the conduit 27 and the tank 14. The pressure in conduit 27 downstream of the bleeder line 28 will be exerted on the diaphragm 50. Increased flow through the valve 24 will result in increased pressure on the diaphragm 50 causing the valve 16 to close more. The pressure drop across the valve 16 will increase resulting in a lower pressure in the supply conduit 27. Decreased flow through the valve 24 will decrease the pressure on the diaphragm 50 permitting the valve 16 to open more reducing the pressure drop thereacross and increasing the pressure in the supply conduit 27. Thus, increased flow through the pilot valve 24 results in lower pressure in the manifold 18 and decreased flow through the pilot valve 24 increases the manifold pressure. These characteristics enable the pressure control valve to maintain a constant pressure to the manifold 18 when the total flow varies as a consequence of the varying number of spray valves that are open at any given time.

When the ground speed of the sprayer changes the pressure in the manifold 18 will be adjusted by the computer 30 to maintain the same application rate for the treatment liquid. Increased ground speed will require increased manifold pressure to increase the flow rate of the treatment chemical from each nozzle 20 so that the application rate remains the same. The computer 30, receiving data indicating an increased ground speed, will activate the stepper motor 32 to increase the force of spring 100 in pilot valve 24 which will result in a lower control pressure being exerted on the diaphragm 50 and consequently causing the valve 16 to open. The manifold pressure will increase to compensate for the increased ground speed. This increase in manifold pressure will occur regardless of whether any of the valves 22 are open. The base or set pressure thus established will then be adjusted to compensate for the flow demand of the valves 22 as they open and close.

A similar action occurs when the ground speed decreases. The lower ground speed necessitates a lower base pressure in the manifold 18, without regard to the open or closed status of the valves 22, and the computer 30 activates the stepper motor 32 to decrease the force of spring 100. The pressure on the diaphragm 50 is thus increased and the valve 16 tends to close resulting in a greater pressure drop across the valve seat 44 and thus effect a lower pressure in the manifold 18. The base manifold pressure may also be set at different pressures upon initial start-up to accommodate treatment liquids having different recommended application rates.

The pilot valve 24 can be calibrated because it is independent of the flow requirements of the system, but is instead dependent only on its own flow characteristics. Thus, the pilot valve 24 can be calibrated initially as a function of the position of the adjuster 104. The computer 30 is then provided with data representing the pressure characteristics of the individual pilot valve as a function of the position of the adjuster 104. A change in the position of the adjuster 104, to change the manifold pressure, is effected by the rotation thereof from a given position and is accomplished by the stepper motor 32 under control of the computer 30. Thus, as the air sprayer varies its ground speed, the computer 30 needs only to adjust the pilot valve 24 to maintain the correct application rate of the treatment liquid.

While a preferred embodiment of the present invention has been shown and described herein, various changes and modifications may be made thereto without departing from the spirit of the invention as defined by the scope of the appended claims.

What is claimed is:

1. A pressure control system for a sprayer having a manifold for supplying treatment liquid under a system pressure to a plurality of nozzle valves with means for independently opening and closing said plurality of valves; said system comprising:

a non-compensated pump for supplying treatment liquid to said manifold;

a pressure control valve interposed between said pump and said manifold and responsive to a control pressure to adjust the pressure in said manifold regardless of whether there is flow through said manifold;

a pilot valve means receiving said liquid at said manifold pressure and capable of reducing said manifold pressure to said control pressure as a function of the number of said plurality of nozzle valves which are open; and means directing said control pressure to aid pressure control valve.

2. The invention according to claim 1, and further comprising:

means for sensing ground speed; and adjusting means operatively connected to said pilot valve means to adjust said control pressure as a function of ground speed, whereby said manifold pressure is increased with increases in ground speed.

3. A pressure control system for a sprayer having a manifold for supplying treatment liquid under pressure to a plurality of nozzle valves with means for independently opening and closing said plurality of valves; said system comprising:

a non-compensated pump for supplying treatment liquid to said manifold;

a pressure control valve interposed between said pump and said manifold and responsive to a control pressure to adjust the pressure in said manifold regardless of whether there is flow through said manifold;

a pilot valve means connected to said manifold and capable of reducing said manifold pressure to said control pressure;

mean communicating said control pressure to aid pressure control valve;

means for sensing ground speed; and adjusting means operatively connected to aid pilot valve means to adjust said control pressure as a function of ground speed, whereby said manifold pressure is increased with increases in ground speed.

4. The invention according to claim 1 wherein said pilot valve means comprises:

a piston having one side exposed to said system pressure;

means or applying a spring force to said piston in a direction opposite the force of said system pressure;

a valve disk attached to and movable with said piston;

a valve seat sealingly engageable with said valve disk;

said valve disk being spaced rom said seat when said pressure force and system pressure forces balance to create a pressure drop and thereby establish a control pressure; and means or adjusting said spring force as a function of the number of said plurality of nozzle valves which are open.

* * * * *